April 23, 1940.                    C. NELSON                    2,198,125
                                PRESSURE COOKER
                            Filed Sept. 27, 1937            3 Sheets-Sheet 1
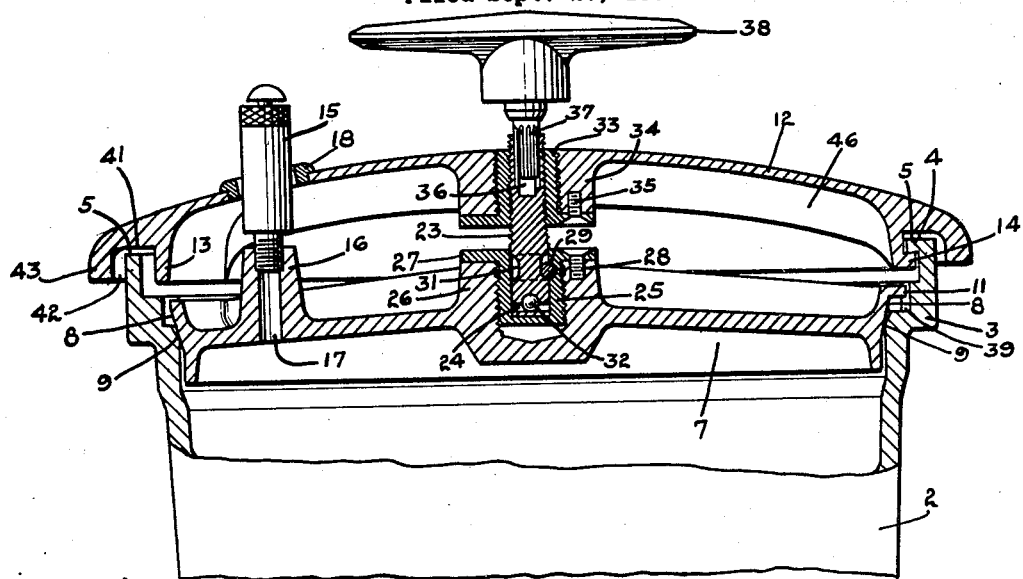
Fig.1
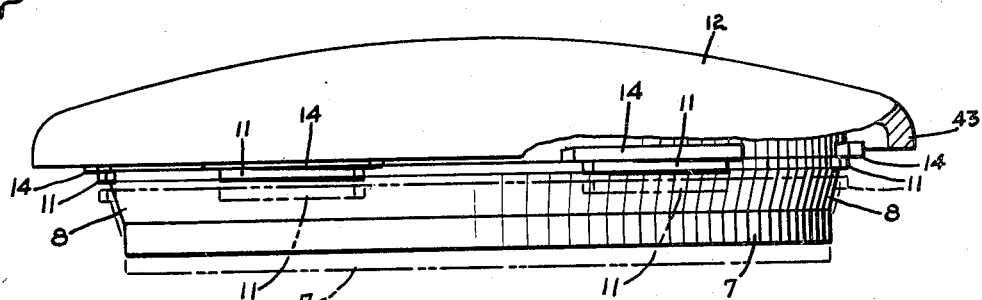
Fig.7
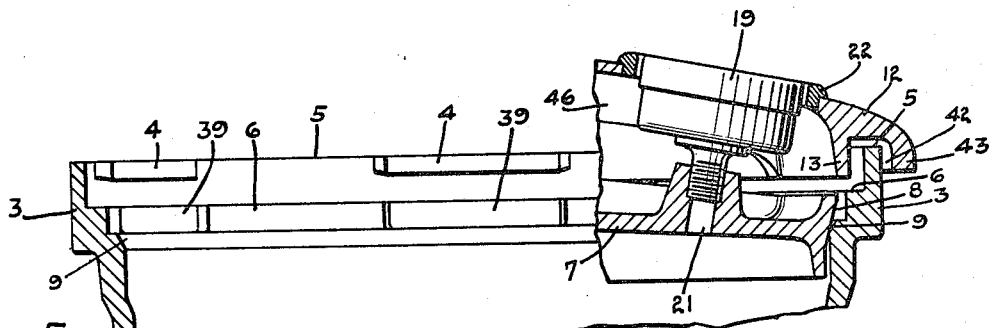
Fig.5
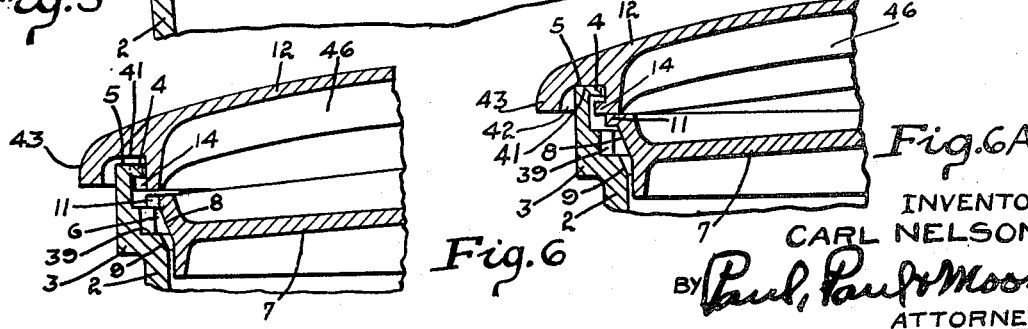
Fig.6                    Fig.6A
INVENTOR
CARL NELSON
BY Paul, Paul & Moore
ATTORNEYS April 23, 1940.  C. NELSON  2,198,125

PRESSURE COOKER

Filed Sept. 27, 1937   3 Sheets-Sheet 2

INVENTOR
CARL NELSON
BY Paul, Paul & Moore
ATTORNEYS

April 23, 1940.　　　　C. NELSON　　　　2,198,125
PRESSURE COOKER
Filed Sept. 27, 1937　　　　3 Sheets-Sheet 3

INVENTOR
CARL NELSON
BY Paul, Paul & Moore
ATTORNEYS

Patented Apr. 23, 1940

2,198,125

UNITED STATES PATENT OFFICE 2,198,125

PRESSURE COOKER

Carl Nelson, Eau Claire, Wis., assignor to National Pressure Cooker Company, Eau Claire, Wis., a corporation of Wisconsin Application September 27, 1937, Serial No. 165,906

2 Claims. (Cl. 220—29)

This invention relates to new and useful improvements in pressure cookers, and more particularly to the closure means therefor.

An object of the present invention is to provide a novel closure for a pressure cooker which is so constructed that when in sealing engagement with the cooker body, the closure cannot be completely removed from the cooker body until the steam or pressure within the cooker body has been released therefrom.

A further object is to provide a pressure cooker including a closure comprising inner and outer members, the inner member being adapted to engage a seat in the upper portion of the cooker body, and the outer closure member being adapted for interlocking engagement with the cooker body to secure the closure thereto, and an operating device operatively connecting together said closure members and adapted to impart relative axial movement thereto, whereby the inner member may be forced into or out of sealing engagement with the seat in the cooker body.

A further object is to provide a pressure cooker having a novel closure which is positive and foolproof in operation, and which presents the utmost in safety, whereby it may be operated by an inexperienced person without danger of becoming burned by escaping steam, when an attempt is made to remove the cover.

Other objects of the invention reside in the novel construction of the closure, per se, which comprises two relatively movable members operatively connected together and adapted for relative axial movement to secure or release the closure from the cooker body; in the unique arrangement of the pressure release valve and pressure gauge, whereby said parts, in addition to their usual functions, also serve to prevent relative rotation of the two closure members; in the provision of means whereby the inner closure member cannot be moved into sealing engagement with its seat until the outer closure member is suitably interlocked with the cooker body, whereby the closure cannot accidentally be blown from the cooker body, in the event that the inner closure member is released from its seat, while the cooker is under pressure; in the novel construction of the outer closure member, whereby any steam released from the cooker when the inner closure member is initially moved out of engagement with its seat, may escape to the atmosphere, and is directed downwardly, whereby a person standing adjacent to the cooker is not likely to be burned by escaping steam; and, in the novel construction of the operating device for the closure members, which is simple to operate and comprises a single operating member, conveniently located on top of the closure, whereby it may readily be operated to secure the closure to the cooker body or remove it therefrom.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the drawings:

Figure 1 is a sectional view on the line 1—1 of Figure 2, showing the upper portion of a pressure cooker with the novel closure means in sealing engagement therewith;

Figure 5 is a detail sectional view showing the arrangement of the pressure gauge;

Figure 6 is a detail sectional view on the line 6—6 of Figure 2, showing a portion of the upper edge of the cooker body and the closure, and the inner closure member being out of sealing engagement with its seat;

Figure 6A is a view showing the outer and inner closure members supported directly upon the uppermost edge of the cooker body, as when the closure is initially placed upon the cooker;

Figure 7 is a view of the closure removed from the cooker body;

Figure 2:
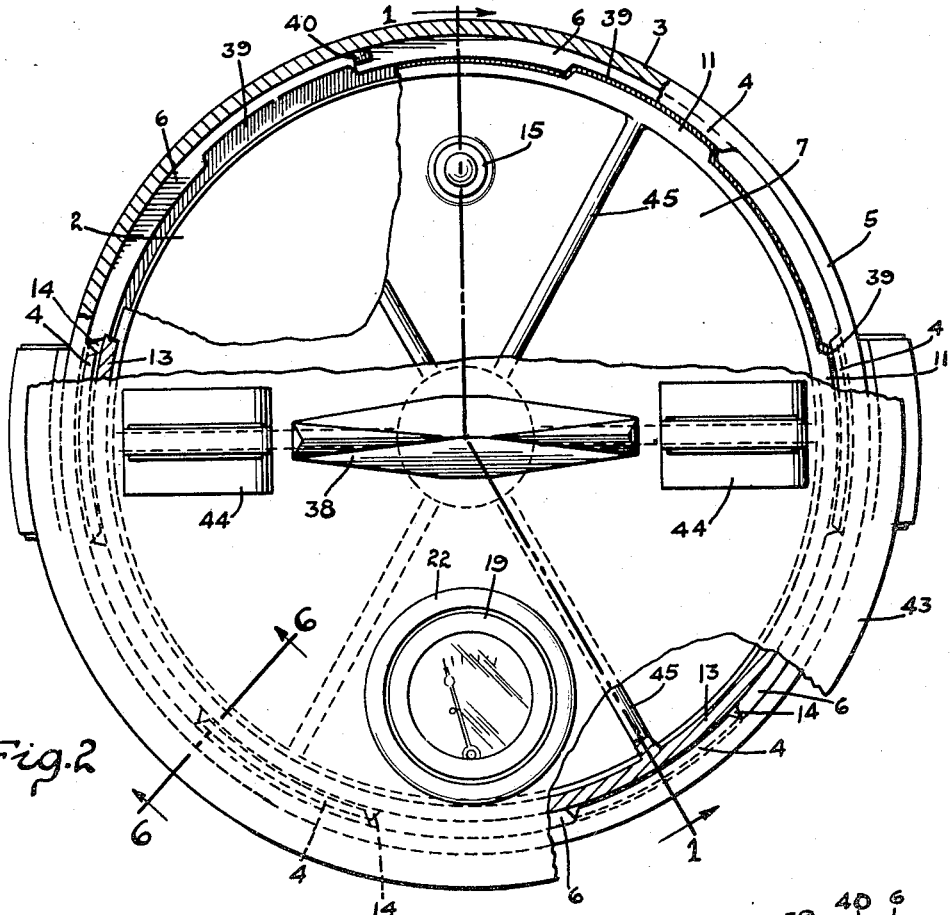
Figure 2 is a top view of the cooker and closure partially broken away.

In the selected embodiment of the invention here shown, there is illustrated in Figure 1, a cooker body 2 of more or less conventional design, provided at its upper portion with an annular ring-like member 3 of slightly larger diameter than the diameter of the cooker body.

The enlarged annular member 3 of the cooker body has a plurality of inwardly projecting lugs or rib portions 4, the upper surfaces of which preferably are flush with the upper edge 5 of the enlarged portion 3. A plurality of similarly spaced lugs or rib portions are provided on the enlarged portion 3 of the cooker body at an elevation below the lugs 4. The lower lugs 6 are arranged in staggered relation with respect to the lugs 4, as best shown in Figure 4, for reasons which will subsequently be described.

An important feature of the present invention resides in the construction of the novel closure for the cooker body. The closure is best illustrated in Figure 1, and comprises an inner member 7 having a portion of its periphery cone-shaped, as shown at 8, adapted to engage a correspondingly shaped seat 9, provided in the upper portion of the cooker body. A plurality of outwardly projecting spaced lugs 11 are provided on the upper portion of the inner closure member 7, as best shown in Figure 3.

Figures 3, 4:
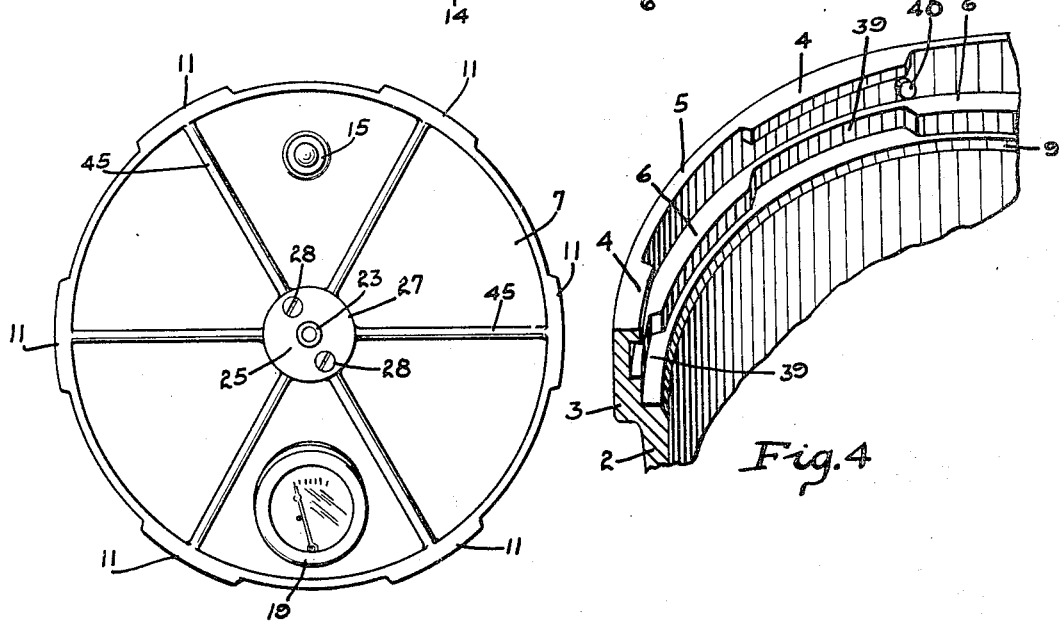
Figure 3 is a top view of the inner closure member removed from the outer member.
Figure 4 is a perspective view showing only a portion of the upper rim of the cooker body, and the means provided thereon adapted to cooperate with means on the closure to secure the latter in position on the cooker body.

The lugs 11 of the inner closure member 7 are adapted to pass between the lugs 4 on the cooker body and into engagement with the upper surfaces of the lugs 6, when the closure is originally placed upon the cooker, as will readily be understood by reference to Figures 4 and 6. When the lugs 6 and 11 are in engagement with one another, the inner closure member 7 is spaced from the seat 9, as shown in Figure 6. In other words, the inner closure member is supported at an elevation, whereby an annular gap is provided between said closure member and the seat 9, to permit free escape of steam from the cooker body.

The outer member 12 of the closure is shown provided with a depending annular flange 13, having formed thereon, a plurality of outwardly projecting spaced lugs 14, which may be passed between the lugs 4 of the cooker body and into registration with said lugs 4, by slightly rotating the closure with respect to the cooker body, as will readily be understood by reference to Figures 1, 2, and 4. When the lugs 14 of the closure member 12 are in registration with the inwardly projecting lugs 4 of the cooker body, the closure cannot be lifted bodily from the cooker, as will readily be understood by reference to Figures 1 and 2. The bottom faces of the lugs 4 of the cooker body and the upper faces of the lugs 14 of the outer closure member 12 are preferably under-cut, as clearly illustrated in Figure 1, thereby to minimize expansion of the upper portion 3 of the cooker body, when the cooker is under pressure.

As best illustrated in Figures 1 and 5, a pressure relief valve 15 is mounted in a boss 16 provided on the wall of the inner closure member 7, and communicates through a bore 17, with the interior of the cooker body. The upper wall of the outer closure member 12 is apertured, as shown in Figure 1, to receive a suitable finishing washer or plate 18, through which the relief valve 15 projects. A pressure gauge 19, of conventional design, is also secured to the inner closure member 7, as shown at 21 in Figure 5, and has its upper portion received in a suitable finishing washer or plate 22, supported in an aperture provided in the top wall of the outer closure member 12. By thus arranging the relief valve 15 and pressure gauge 19, they provide a very neat appearance, and in addition to the usual functions thereof, they also serve as dowels to prevent the inner and outer closure members 7 and 12, respectively, from relatively rotating with respect to one another.

Means is provided for imparting relative axial movement to the closure members 7 and 12, to force the inner member 7 into or out of sealing engagement with the seat 9. The means provided for thus actuating the closure members is best illustrated in Figure 1, and comprises a stem 23 having its lower terminal received in a socket 24, shown provided in a bushing 25 received in a threaded hub 26, provided in the center of the inner closure member 7. The bushing 25 is shown having a flange 27 adapted to seat against the upper face of the hub 26, and may be secured thereto by a suitable screw 28. The bushing 25 further has a pin 29 secured therein, a portion of which projects into the bore of the bushing and is received in an annular groove 31 provided on the stem 23. The pin 29 serves to retain the stem 23 in the bushing 25 so that it cannot become separated therefrom. A suitable anti-friction bearing element 32 is preferably provided in the bottom of the bore in the bushing 25 to minimize friction, when the stem 23 is rotated to force the inner closure member 7 into or out of sealing engagement with the seat 9.

The upper end of the stem 23 is shown threaded, as illustrated in Figure 1, and is received in threaded engagement with a bushing 33 secured to a hub 34 of the outer closure member 12, by a suitable screw 35.

The stem 23 is shown provided at its upper end with a splined socket 36 adapted to non-rotatably receive a splined terminal 37 provided on a suitable operating handle or operating device 38, as best illustrated in Figure 1. When the operating handle 38 is rotated in one direction, axial movement is imparted to the inner closure member 7 with respect to the outer closure member 12, whereby it may be conveniently forced into engagement with the seat 9, or moved out of engagement therewith.

The closure members 7 and 12 are normally connected together, as shown in Figures 1 and 7, to provide a unitary structure. When the cooker is to be closed and sealed, the closure, as a whole, is fitted into the mouth of the cooker body with the lugs 14 of the upper closure member 12 passing between the inwardly projecting lugs 4 of the cooker body, whereupon the lugs 11 of the inner closure member 7 may engage the lugs 6, as best shown in Figure 6, thereby preventing the inner closure member 7 from sealingly engaging the seat 9. Before the closure member 7 can be moved into engagement with the seat 9, the closure, as a whole, including the members 7 and 12, must be relatively rotated upon the cooker body until the lugs 11 on the inner member 7 are moved into registration with the spaces 39 provided between the lugs 6. When the lugs 11 register with the spaces 39, the outwardly projecting lugs 14 on the upper closure member 12 will be in registration with the inwardly projecting lugs 4 on the cooker body. The operating handle 38 is then rotated in a direction to move the inner closure member in a downward direction, whereby its outer tapered surface 8 may be moved into sealing engagement with the seat 9. Continued rotation of the operating handle 38 will subsequently cause the outwardly projecting lugs 14 on the upper closure member 12 to interlockingly engage the bottom faces of the inwardly projecting lugs 4, thereby preventing further upward movement of the outer member 12, with the result that the inner member 7 is forced tightly into sealing engagement with the seat 9.

The inner and outer closure members 7 and 12 are preferably so related that when the operating handle 38 is manipulated to move the inner closure member 7 out of engagement with its seat, as shown in Figures 6 and 6A, the annular face 41 of the outer closure member 12 will engage the upper edge 5 of the enlarged portion 3 of the cooker body, whereby the entire cover is supported directly on said edge 5. When so positioned, the cover may be conveniently rotated upon the cooker body from one position to another, in the act of moving the lugs 14 into or out of interlocking engagement with the lugs 4. By thus forming the parts, it will be noted, by reference to Figure 6A, that the lugs 11 are spaced slightly above the upper surfaces of the lugs 6, whereby the lugs 11 will not engage the ends of the lugs 6, when the inner cover member 7 is elevated to a position to permit the cover to be relatively rotated on the cooker body. When releasing the inner cover member 7 from its seat, the operating handle 38 is preferably rotated sufficiently to cause the upper faces of the lugs 11 thereof to engage the bottom faces of the lugs 14 of the outer closure member 12, as shown in Figures 6A and 7, thus assuring the operator that the lugs 11 will readily clear the lugs 6, when the cover is relatively rotated on the cooker body.

It will also be noted by reference to Figures 1 and 6, that the spacing between the annular face 41 and the upper faces of the lugs 14 of the outer closure member 12, is slightly greater than the thickness of the lugs 4, whereby an annular gap is provided between the faces 41 and 5 to permit the escape of steam from the cooker body, when the inner closure member 7 is initially moved out of engagement with its seat.

It is to be understood, however, that if the pressure of the steam within the cooker is not sufficient to counteract the weight of the closure, as a whole, the face 41 of the upper closure member may not be moved out of engagement with the face 5 of the cooker body. When such is the case, the steam pressure within the cooker body is not sufficient to cause any damage, should the cover suddenly be removed from the cooker body.

If the cover is released when the cooker is under high pressure, the steam escaping between the inner closure member and the seat 9 may bodily elevate the cover to the position shown in Figure 6, wherein the steam may readily escape to the atmosphere by the annular gap or passage provided between the two closure members and the upper portion of the cooker body. As soon as the excess pressure has escaped from the cooker body, the cover will recede to the position shown in Figure 6A, and may then be rotated to a position to permit its complete removal from the cooker without danger of the operator being burned by escaping steam.

The outer closure member 12 is preferably provided with an annular downwardly extending flange 43, as clearly illustrated in Figure 1, which acts as a deflector to downwardly direct steam escaping through the gap 42, thereby minimizing the danger of anyone standing adjacent to the cooker being burned from escaping steam, in the event that the closure is released from the cooker body before releasing the steam therefrom. Suitable means, such as a stop pin 40, is provided in the upper portion of the cooker body, for limiting relative rotation of the closure on the cooker body, in both directions. This stop is preferably so located as to be engaged by the ends of adjacent lugs 11 on the inner closure member 7.

The novel closure means herein disclosed, has been found very practical and efficient in operation. It comprises but a single operating member which, when rotated in one direction, will force the closure into sealing engagement with its seat and when rotated in the opposite direction, will release it therefrom. Suitable handles 44 are shown secured to the upper closure member 12, whereby the closure may conveniently be removed from or placed upon the cooker body. The lower closure member 7 is suitably ribbed, as shown at 45 to strengthen it, and the outer closure member 12 is preferably similarly ribbed, as shown at 46, whereby the closure members may withstand high pressures without deflection.

In the drawings, I have shown the operating handle 38 as being detachably engaged with the threaded stem 23. It is to be understood, however, that in some instances, it may be found desirable to so secure the operating handle to the stem 23, that the two closure members are normally inseparably connected together.

The novel closure means herein disclosed presents a very neat appearance and represents the utmost in simplicity. It is devoid of a plurality of screws or threaded elements for securing the closure to the cooker body, as is common practice in devices of this general type, whereby the upper portion of the cover is relatively free from obstructions, whereby it may readily be kept clean.

Figure 8:
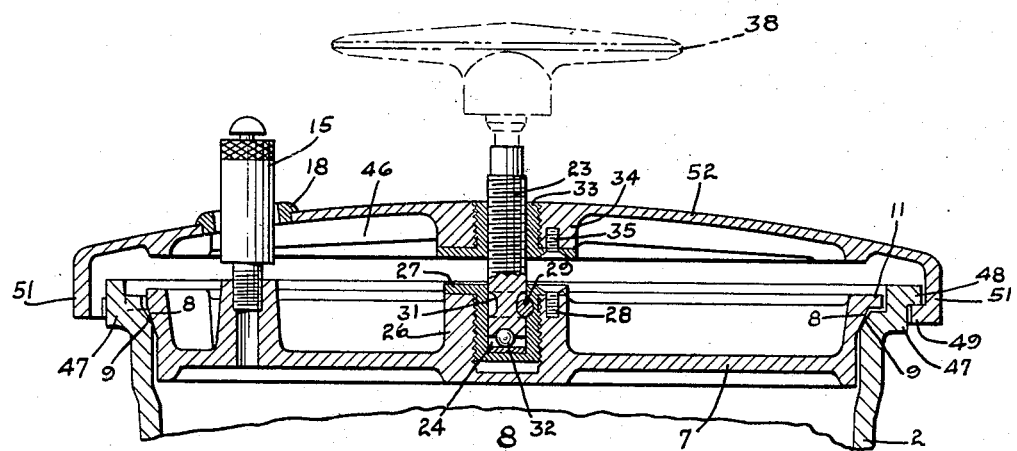
Figure 8 is a view showing a slightly modified construction wherein the outer closure member has inwardly projecting lugs adapted to engage outwardly projecting lugs on the cooker body, thereby to secure the closure to the cooker body.
Figure 9:
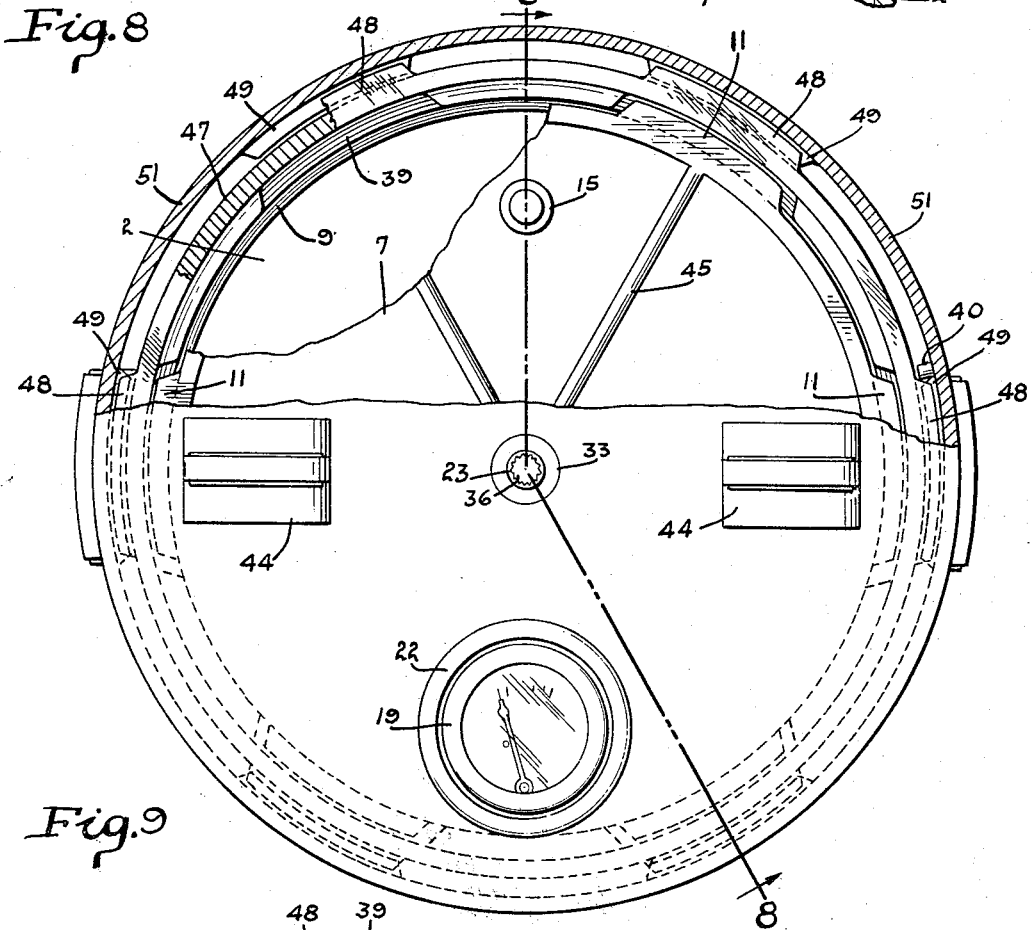
Figure 9 is a top view of Figure 8, partially broken away.
Figure 10:
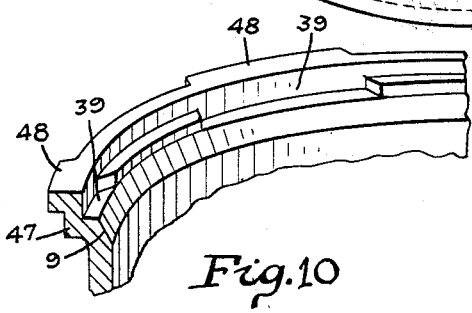
Figure 10 is a detail sectional view showing the means provided on the upper edge of the cooker body for securing the closure thereto.

In Figures 7, 8, and 9, there is shown a slightly modified construction, wherein the cooker body 2 is provided with an enlarged annular portion 47 provided with outwardly projecting lugs 48 adapted to be engaged by inwardly projecting lugs 49 provided on the depending flange 51 of an outer closure member 52. The lugs 48 and 49 of the cooker body 2 and the closure member 52, respectively, are spaced apart in a manner similar to the lugs 4 and 14 of the structure illustrated in Figure 1, so that the cover is operated on the cooker body in a manner substantially the same as the closure means illustrated in Figure 1.

From the foregoing, it will be seen that the danger of a person becoming burned from escaping steam, should the cover inadvertently be released, while the cooker is under high pressure, is positively eliminated. Any steam released from the cooker body, when the inner closure member 7 is initially released from its seat, is directed downwardly by the depending flange 43, whereby it is not likely to injure anyone. The lugs 4 and 14 also cooperate to positively prevent the closure from being blown from the cooker, in the event the closure is released while the cooker is under pressure, as the lugs 6 and 11 are so related to the lugs 4 and 14, that before the lugs 14 of the outer closure member 12 can be moved out of interlocking engagement with the lugs 4, the inner closure member 7 must be moved out of sealing engagement with the seat 9, as hereinbefore stated. When the inner closure member 7 has been elevated to the position shown in Figure 6A, the cover, as a whole, may readily be bodily rotated upon the cooker body to a position to permit its convenient removal therefrom.

I claim as my invention:

1. A pressure cooker including a body provided with a suitable seat, a closure for said body comprising inner and outer members, the inner member having means for engaging said seat, and the outer member having means adapted for interlocking engagement with means on the cooker body, when the closure is rotated on said body, thereby to secure the closure to the cooker body, said securing means requiring that the outer closure member be rotated to a predetermined position on the cooker body to secure it thereto, an operating device on the outer closure member for moving the inner closure member into and out of sealing engagement with said seat, means on the inner closure member cooperating with means on the cooker body to prevent the inner member from engaging said seat until the outer closure member has been moved to said predetermined position, and means for preventing relative rotation of said closure members.

2. A pressure cooker including a body provided with a suitable seat, a closure for said body comprising inner and outer members, the inner member having means for engaging said seat, and the outer member having means adapted for interlocking engagement with means on the cooker body, when the closure is rotated on said body, thereby to secure the closure to the cooker body, said securing means requiring that the outer closure member be rotated to a predetermined position on the cooker body to secure it thereto, an operating device on the outer closure member for moving the inner closure member into and out of sealing engagement with said seat, means on the inner closure member cooperating with means on the cooker body to prevent the inner member from engaging said seat until the outer closure member has been moved to said predetermined position, means for preventing relative rotation of said closure members, and the marginal edge of the outer closure member extending outwardly over the upper edge of the cooker body and downwardly and being spaced from said edge to provide a passage through which steam which may escape from the cooker, when the closure is initially released, is directed downwardly.

CARL NELSON.